May 16, 1933.  W. C. YEAKEL  1,908,722
CONVEYER SYSTEM AND CHUTE
Filed Sept. 26, 1930   2 Sheets-Sheet 1

Inventor
Walter C. Yeakel
By Brown, Jackson, Boettcher & Dienner
Att'ys

May 16, 1933. W. C. YEAKEL 1,908,722
CONVEYER SYSTEM AND CHUTE
Filed Sept. 26, 1930 2 Sheets-Sheet 2
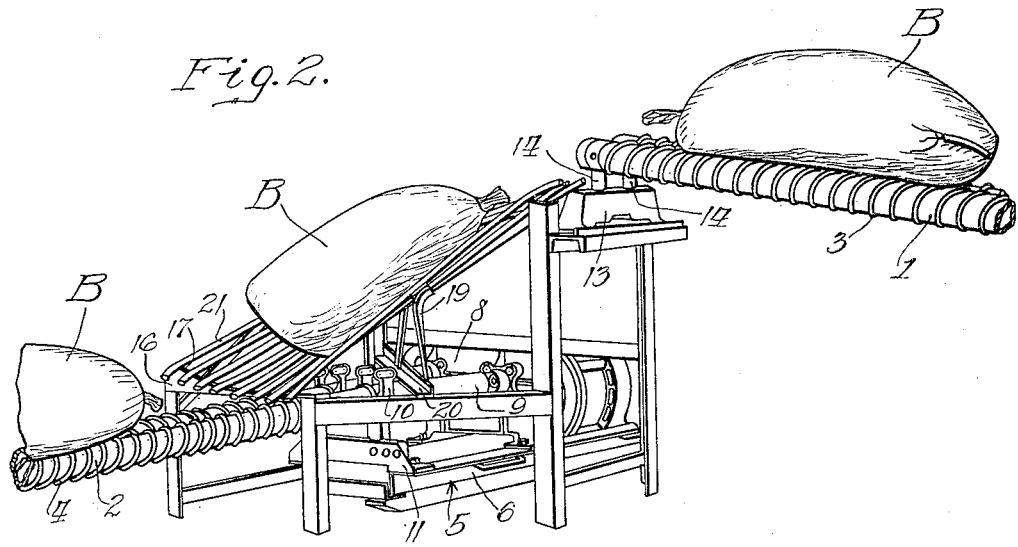
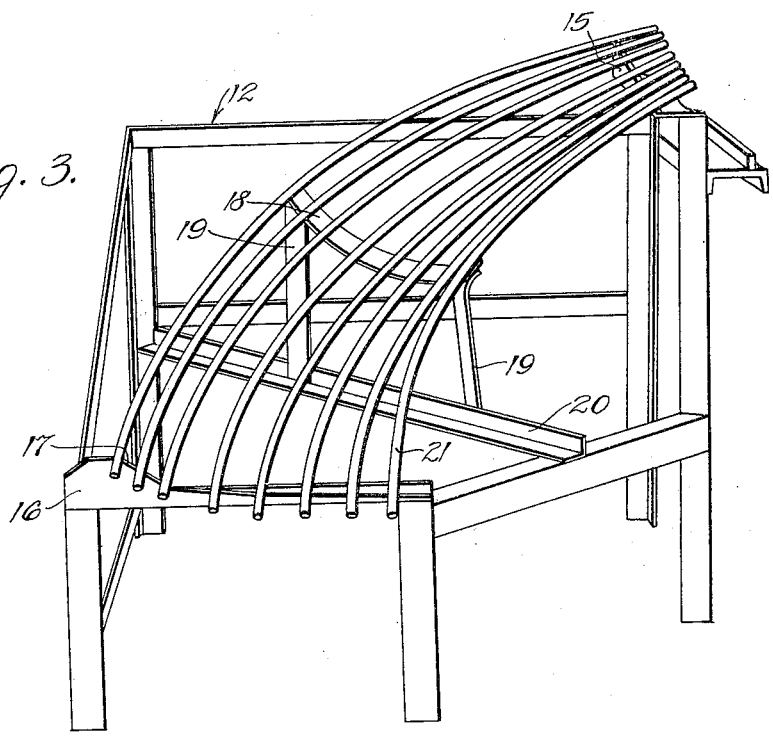
Inventor
Walter C. Yeakel
By Brown, Jackson, Boettcher & Dienner,
Att'ys Patented May 16, 1933

1,908,722

UNITED STATES PATENT OFFICE

WALTER C. YEAKEL, OF BATTLE CREEK, MICHIGAN, ASSIGNOR TO CLARK TRUC-TRACTOR COMPANY, OF BUCHANAN, MICHIGAN, A CORPORATION OF MICHIGAN

CONVEYER SYSTEM AND CHUTE

Application filed September 26, 1930. Serial No. 484,561.

This invention relates to conveyer systems, and more particularly to systems comprising two or more conveyers disposed in angular relation and means for transferring articles from one of the conveyers to the other conveyer.

My invention is particularly adapted for use with a conveyer system employing two conveyers, such as that disclosed in the patent to John J. Armstrong and Robert S. Woodford, issued December 8, 1925, No. 1,564,926. Conveyers of this type are particularly adapted for use in handling goods in bags or bales, or other suitable packages, in warehouses and like establishments, loading and unloading cars, ships or other carriers, and for many other purposes. In the use of such conveyers it is frequently desirable that the articles be transferred from one conveyer to a second conveyer disposed in angular relation to the first conveyer, to facilitate storing or handling of such articles. One of the main objects of my invention is to provide a conveyer system including two conveyers disposed in angular relation and means for transferring articles delivered by one of the conveyers, to the other conveyer without interfering with or interrupting the operation of the two conveyers. Another object of my invention is to provide transferring means of the character stated which can be applied with facility in the conveyer system as conditions may require. A further object is to provide a chute of novel construction for delivering articles from one conveyer to the other, this chute offering minimum resistance to passage of the articles thereover. Further objects and advantages of my invention will appear from the detailed description.

In the drawings:

Figure 2 is a perspective view of the adjacent end portions of two conveyers in a system in accordance with my invention, and associated parts, looking toward the inner side of the chute or transfer means;

Figure 3 is a front view of the chute and the supporting frame therefor looking toward the chute from the lower end thereof.

Figure 1:
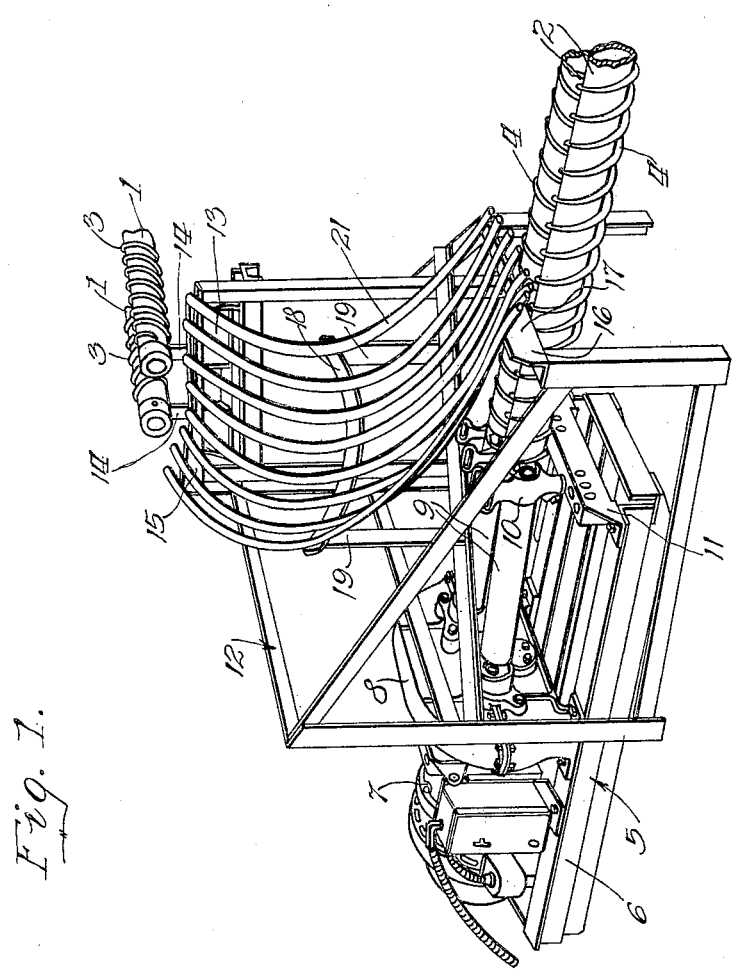
Figure 1 is a perspective view of the adjacent end portions of two conveyers and associated parts of a conveyer system in accordance with my invention looking toward the outer side of the transfer means or chute.

I have illustrated my invention as applied to a conveyer system including a pair of upper conveyer shafts 1 and a pair of lower conveyer shafts 2 extending laterally of shaft 1 and substantially at right angles thereto. Shafts 1 are rotatably mounted in a suitable manner and each of these shafts is provided with a thread 3 of considerable depth and appropriate pitch extending about the shaft, the threads on these shafts being oppositely related and the shafts being rotated downwardly toward each other, or in a clockwise and counter-clockwise direction, respectively, as considered in Figure 1. The direction of the thread 3 of each shaft is such that, when the shafts are rotated in the manner described, articles placed upon the shafts will be propelled therealong to the delivery end of the conveyer.

Each of the shafts 2 of the lower conveyer is provided with a thread 4, the threads of these shafts being oppositely related and the shafts being rotated in opposite directions for propelling articles along the same by means of the threads 4. A driving unit 5 is provided for driving the shafts 2. This unit includes a suitable platform or base 6 upon which is mounted an electric motor 7 having driving connections, through suitable gearing enclosed in a housing 8 and connecting members 9, to the shafts 2. The adjacent ends of shafts 2 are rotatably mounted, in a suitable manner, by bearing and supporting members 10 suitably secured to a supporting sill 11 which, in turn, is secured to the base 6. The particular manner of supporting the shafts 2 is not of the essence of the present invention, it being sufficient to note that the shafts are suitably supported and driven and are disposed below shafts 1 and in angular relation thereto.

In order that articles delivered from the upper conveyer may be transferred to the lower conveyer, I provide means, in the form of a chute, for effecting such transfer of the articles, this chute being mounted upon a frame 12 of suitable construction which straddles a portion of the unit 5, including the connecting members 9 and the adjacent ends of the shafts 2. A sill 13 is suitably secured to this frame and supporting members 14 are secured to and extend upwardly from this sill, such supporting members rotatably supporting the adjacent ends of the shafts 1 in a suitable manner. A supporting member or strip 15 is secured to the frame 12 below and adjacent the ends of shafts 1, this member 15 being disposed transversely of these shafts. The upper face of member 15 is inclined downwardly and inwardly of the angle between the two conveyers so that the effective height of this member decreases inwardly of the angle, as shown more clearly in Figure 3. A lower supporting member or strip 16 is secured to frame 12 above shafts 2 and extends transversely of the latter. This member may be in the form of an angle strip, the upwardly extending flange of which is suitably shaped so as to incline downwardly and inwardly of the angle between the two conveyers. Adjacent its outer end, member 16 is provided with a portion 17 the upper edge of which is inclined downwardly and inwardly of the angle at a much sharper degree than the remaining portion of the upper edge of this member. A downwardly curved saddle 18, conveniently formed from a suitable length of strap metal, is supported between the members 15 and 16 in a suitable manner, as by means of brackets 19 suitably secured to an angle strip 20 extending across the frame 12 at an inclination and approximately diagonally thereof. The elements of frame 12 and associated parts may be secured together in any suitable or preferred manner, but are preferably welded together.

Rods 21 are suitably secured to members 15 and 16 and saddle 18. These rods are conveniently formed of metal and are welded to the supporting members and the saddle. The rods 21 are disposed in spaced relation and are bent or curved lengthwise and toward the outer side of the angle between the adjacent ends of the two conveyers. Due to the downward curvature of saddle 18, the rods 21 are disposed at successively lower levels from each side of the chute defined by these rods to the center of this chute. The chute thus formed by the rods is of downwardly concaved cross-section and is inclined downwardly toward its inner side. The rods 21 extend lengthwise of this chute and are curved lengthwise and toward the outer side of the chute in such manner that the chute, as a whole, extends through a curve of 90° for delivering articles from the upper conveyer to the lower conveyer disposed at right angles thereto. The degree of curvature of the chute may be varied as conditions require, that is, chutes of different degrees of curvature may be employed to correspond to different degrees of angle between the conveyers. Under ordinary conditions, however, where two conveyers are employed in angular relation with one extending laterally of the other, the angle between these two conveyers will be approximately 90° and a chute having a corresponding curvature will be used.

In Figure 2 I have illustrated my conveyer system as used for conveying bags of produce, such as sugar. The upper ends of the rods 21 extend beneath the adjacent ends of shafts 1, and the lower ends of these rods are bent downwardly toward the shafts 2, as in Figure 1. The articles or bags B are caused to travel along the shafts 1, by the threads 3 thereof, and are discharged from the upper conveyer onto the chute, down which the bags slide, this chute acting to deliver the bags to the lower conveyer. By employing the rods 21 for forming the chute, I reduce friction between the articles or bags to a minimum so that the bags readily slide, under the influence of gravity, down the chute. By having the chute inclined downwardly and inwardly, I assure that articles delivered from the upper conveyer to the chute will not pass out of the outer side of the chute but will be deflected thereby into the chute, since the outer side thereof is somewhat higher than the inner side. The element 17 of member 16, due to its increased pitch, serves, in effect, to bank the outer and lower side of the chute to such an extent as to direct the bags or articles sliding down the chute toward the inner side thereof sufficiently to assure proper delivery of such articles to the lower conveyer. Rods 21 also prevent movement of the bags transversely of the chute.

The frame 12 and the chute and associated parts carried thereby constitute a unit which is particularly adapted to be disposed between an upper conveyer and a lower conveyer arranged substantially at right angles to the upper conveyer, this unit being also well adapted to accommodate a power unit for driving the shafts 2 of the lower conveyer. The chute itself, due to its particular construction and arrangement is especially adapted for transferring articles from one conveyer to a second conveyer disposed in angular relation to the first conveyer, particularly when the conveyers are disposed at different elevations and substantially at right angles to each other. While my invention is applicable, in its broader aspects, to conveyers of various types, it is particularly adapted for use with screw conveyers of the type herein disclosed, in which conveyers the number of shafts employed may be varied to suit conditions or as may be desired.

What I claim is:

1. A guide chute for transferring articles from a first conveyer to a second conveyer extending laterally of the first conveyer in angular relation thereto, said chute comprising a plurality of rods disposed lengthwise of the chute and in spaced relation, said rods being curved lengthwise and toward one side of the chute, a downwardly concaved supporting member intermediate the ends of said rods and extending transversely thereof, the rods being disposed on said member at successively lower levels from each side of the chute to the center thereof whereby the chute is of downwardly concaved cross-section.

2. A guide chute for transferring articles from a first conveyer to a second conveyer extending laterally of the first conveyer in angular relation thereto, said chute comprising two supporting members disposed at different levels and inclined downwardly and transversely of the chute toward one side thereof, and a plurality of rods disposed lengthwise of the chute and in spaced relation, said rods being secured to said members and curved lengthwise and toward the other side of the chute, the chute being inclined downwardly and transversely toward the first mentioned side thereof.

3. A guide chute for transferring articles from a first conveyer to a second conveyer extending laterally of the first conveyer in angular relation thereto, said chute comprising a plurality of rods disposed lengthwise of the chute and in spaced relation, said rods being curved lengthwise and toward one side of the chute and means for supporting the rods at successively lower levels from each side of the chute to the center thereof and at an inclination downwardly toward the other side of the chute whereby the chute is of downwardly concaved cross-section and is inclined downwardly and transversely toward said other side thereof.

4. A laterally curved guide chute for transferring articles from a first conveyer to a second conveyer extending laterally of the first conveyer in angular relation thereto, said chute comprising spaced rods disposed lengthwise of the chute, supporting means therefor comprising an upper member having an inwardly inclined portion, a downwardly concaved intermediate member, and a lower member having an inwardly inclined portion, said supporting members inclining said chute inwardly and providing said chute with a downwardly concaved intermediate section for retarding travel of articles along the chute.

5. In a chute of the class described, a frame, supporting members disposed normal to each other and in different planes on said frame, and a plurality of rods curved toward one side of said chute and disposed adjacent their ends on said members, the supporting members being inclined in a direction opposite to the curvature of said rods.

6. In a chute of the class described, a frame, upper and lower transversely inclined supporting members carried by said frame, and a plurality of rods disposed in spaced relation on said supporting members, said lower supporting member having a supporting surface disposed at a greater inclination than the corresponding surface of the upper supporting member so as to impart greater concavity to said chute at its lower portion than at its upper portion.

7. In a chute of the class described, a frame, supporting members carried by said frame and inclined downwardly toward one side thereof, said members being disposed normal to each other, a plurality of spaced rods curved toward the other side of said chute and extending between said supporting members, and an intermediate downwardly concaved member carried by said frame and forming a support for said rods.

8. A downwardly inclined and concaved guide chute for transferring articles from a first conveyer to a second conveyer extending laterally of the first conveyer in angular relation thereto, said chute comprising spaced rods disposed lengthwise of the chute and supporting means therefor, said supporting means including a downwardly concaved member secured to the rods intermediate their ends and disposed to provide said chute with greatest concavity adjacent said member.

9. A laterally curved and inclined guide chute for transferring articles from a first conveyer to a second conveyer extending laterally of the first conveyer in angular relation thereto, said chute comprising spaced rods disposed lengthwise of the chute, and supporting means therefor, said means including supporting members adjacent the ends of said rods and inclined transversely of the chute and downwardly toward one side thereof, said rods being disposed on said members and being curved outwardly toward the other side of the chute and downwardly to define a downwardly concaved chute, and an intermediate downwardly concaved supporting member providing said chute with its greatest concavity adjacent the intermediate portion thereof.

In witness whereof, I hereunto subscribe my name this 23 day of September, 1930.

WALTER C. YEAKEL.